(12) United States Patent
Nishida et al.

(10) Patent No.: US 6,879,349 B2
(45) Date of Patent: Apr. 12, 2005

(54) BROADCASTING RECEIVER WITH AUTOMATIC AUDIO SELECTION FUNCTION

(75) Inventors: Yusuke Nishida, Ikoma (JP); Manabu Yamamoto, Mukou (JP); Yasuhiro Inui, Yao (JP); Kazuhiko Tani, Daito (JP); Takahiro Katayama, Daito (JP)

(73) Assignee: Funai Electric Co., Ltd., Daito (JP)

( * ) Notice: Subject to any disclaimer, the term of this patent is extended or adjusted under 35 U.S.C. 154(b) by 516 days.

(21) Appl. No.: 10/141,779

(22) Filed: May 10, 2002

(65) Prior Publication Data

US 2002/0186328 A1 Dec. 12, 2002

(30) Foreign Application Priority Data

May 10, 2001 (JP) ........................................ 2001-139942

(51) Int. Cl.[7] ................................................. H04N 5/44
(52) U.S. Cl. ........................ 348/553; 348/738; 348/569
(58) Field of Search ................................ 348/738, 725, 348/728, 705, 706, 462, 563, 569, 564, 553, 465, 468; H04N 5/44, 5/50, 5/445

(56) References Cited

U.S. PATENT DOCUMENTS 6,661,466 B1 * 12/2003 Kou ........................... 348/553

FOREIGN PATENT DOCUMENTS

| JP | 11-098434 | 4/1999 |
| JP | 2000-152108 | 5/2000 |

* cited by examiner

Primary Examiner—Sherrie Hsia
(74) Attorney, Agent, or Firm—Crowell & Moring LLP

(57) ABSTRACT

A broadcasting receiver that receives broadcasting signals transmitted by a broadcasting station accompanying audio signals of multiple languages and automatically selects a certain broadcasting language to be outputted is described here. The receiver is capable of displaying a "Priority Switching Language Registration Menu" on its display in order to set up and register switching of priority languages. A priority language list determined by a user referring to a language list database displayed on the display is stored into a memory together with the maximum number of audio channels set up by the user. A control unit consisting of a CPU acquires a broadcasting language information currently being received referring to a VCT (Virtual Channel Table) acquired by control signal analysis when the receiver is started up or a broadcasting channel is changed by the user, or a broadcasting program is changed, and selects the broadcasting language and the number of audio channels to be outputted by an audio output unit based on the information stored. Thus, the broadcasting language and the number of audio channels most suitable for the user is always automatically selected and decided for the broadcasting languages and the number of audio channels that vary with each broadcasting channel.

10 Claims, 5 Drawing Sheets

BROADCASTING RECEIVER WITH AUTOMATIC AUDIO SELECTION FUNCTION

BACKGROUND OF THE INVENTION

The invention relates to a broadcasting receiver for receiving broadcasting signals transmitted from a broadcasting station with multiple language audio signals and automatically selecting a certain broadcasting language to be outputted.

Conventionally, signal processing devices have been known that execute channel switching operations ahead of channel selection processes in order to shorten the time until audio and/or images are outputted when switched to specified channels and enhance user convenience (e.g., Japanese Unexamined Patent Publication No. 2000-152108). There is another type of broadcasting receiver that stores in a memory the type of language to be displayed on the display selected by the user, automatically extracts audio signals of the language when multiple broadcasting languages are received, and generates output from a speaker using the language (e.g., Japanese Unexamined Patent Publication No. 11-98434). Moreover, there are other broadcasting receivers for conventional analog broadcasts that can handle a single audio channel (mono) or two audio channels (stereo/sub audio program).

Furthermore, in recent years, broadcasting stations in North America are distributing digital broadcasts based on ATSC (Advanced Television Systems Committee) Standards. As a result, certain types of broadcasting receivers (set top box; hereinafter called "STB") are becoming popular that receive these digital broadcasts and convert them into image signals that can be received by televisions designed for analog broadcasts based on the existing NTSC (National Television Systems Committee) Standards.

Those digital broadcasts are distributed, by each channel assigned with a different broadcast language, and such broadcast languages are sometimes distributed with audio signals of three or more kinds of languages. The combination of these languages used for these audio signals vary with the program compositions, thus causing stations to transmit audio signals of various languages depending on programs and time zones. Digital broadcasting can distribute audio signals of audio channels of up to 5.1 channels. The number of audio channels varies with the composition of a particular broadcasting program and each station distributes audio signals of a different number of audio channels for a given time zone.

It is possible to enhance user convenience by providing a STB for receiving such digital broadcasting with various functions of the signal-processing device disclosed by Japanese Unexamined Patent Publication No. 2000-152108 and of the broadcasting receiver disclosed by Japanese Unexamined Patent Publication No. 11-98434. However, the signal-processing device of the former is not capable of automatically selecting a broadcasting language specified by the user from the received broadcasting signals. Also, the broadcasting receiver of the latter is not capable of automatically selecting an optimum language by assigning an order of priority to multiple languages as only the language used for display is selected as the audio language. Moreover, neither of these devices is capable of always automatically determining the optimum number of audio channels within the maximum number of channels allowed for output to the speaker connected to the device in correspondence with audio channels that are constantly changing in accordance with varying program compositions. Consequently, the user must set the broadcasting language and the number of audio channels each time the channel is changed, so that this setup operation is cumbersome and the devices are not user-friendly.

SUMMARY OF THE INVENTION

It is an object of the present invention to solve the abovementioned problems and to provide a broadcasting receiver that is capable of always automatically selecting and deciding the optimum broadcasting language and the number of audio channels for the user in correspondence to the broadcasting languages and the number of audio channels that vary with each channel, when the receiver is turned on or the channel is changed by the user.

In the present invention, a broadcasting receiver comprises: an input unit for entering channel change instructions into the receiver; a receiving unit for receiving coded digital broadcasting signals transmitted by a broadcasting station accompanying audio signals of multiple languages; a signal extracting unit for extracting image signals, audio signals and control signals from the digital broadcasting signals received by the receiving unit; a decoding unit for decoding the image signals extracted by the signal extracting unit, and outputting the decoded signals to a display device connected to the receiver for displaying images; a memory for storing the control signals extracted by the signal extracting unit; an on-screen display ("OSD") output unit for generating a specified OSD display on the display device; an audio signal processing unit for issuing audio output based on the audio signals to an audio output unit; and a control unit for controlling the abovementioned units including the input and output units and the memory, wherein the control unit executes: a process of preparing a priority language list by allowing the user to select broadcasting languages sequentially in the order of priority by using the input unit and storing it in the memory; a process of acquiring broadcasting language information broadcasted over a channel currently being received by referring to a VCT (Virtual Channel Table) acquired by analyzing the control signals extracted by the signal extracting unit either when the receiver is turned on or a channel change instruction is inputted by the user, or when a broadcast program is changed; and a process of automatically selecting a broadcasting language to be outputted by the audio output unit from the broadcasting language information based on the order of priority of the priority language list and transmitting signals concerning the broadcasting language to the audio signal processing unit.

In this configuration, the control unit allows the user to select multiple priority languages and prepares a priority language list. The selection of these priority languages is made through the input device in the order of priority. Also, the control unit acquires a channel information including the broadcasting language information of the received channels referring to VCT when the receiver is turned on or when the channel is changed by the user, and automatically retrieves from the audio channel information the priority languages selected by the user according to the order of priority. If it is found that priority languages exist as a result of the retrieval, the signal related to the language that corresponds to the language with a higher priority is transmitted to the audio signal-processing unit, so that the audio output is generated in the language of the higher priority. Thus, the broadcasting language most suitable for the user is always automatically selected to be outputted from the audio output unit.

In the broadcasting receiver of the present invention, the memory may store a pre-recorded language list concerning broadcasting languages that have possibility of being broadcasted from the broadcasting station; and the control unit may generate an OSD display of the language list on the display device in preparing the priority language list.

In this configuration, the language list pre-registered in the memory is displayed on the OSD when the user prepares the priority language list.

In the broadcasting receiver of the present invention, the control unit may automatically select broadcasting languages to be outputted from the audio output unit in accordance with an order of priority set up by the broadcasting station, when no broadcasting language selected in the priority language list exists in the broadcast language information, and transmit signals concerning the broadcast languages to be outputted from the audio output unit to the audio signal processing unit.

If the language selected by the user does not exist in the broadcasting language information broadcasted in the channel currently being received under this configuration, the broadcasting language is automatically selected according to the order of priority provided by the broadcasting station.

In the present invention, a broadcasting receiver comprises: an input unit for entering channel change instructions into the receiver; a receiving unit for receiving coded digital/analog broadcasting signals transmitted by a broadcasting station accompanying audio signals of multiple languages; a signal extracting unit for extracting image signals, audio signals and control signals from digital broadcasting signals received by the receiving unit; a digital/analog decoding unit for decoding the image signals extracted by the signal extracting unit or image signals contained in the analog broadcasting signals, and outputting the decoded signals to a display device connected to the receiver for displaying images; a memory for storing the control signals extracted by the signal extracting unit; an on-screen display ("OSD") output unit for generating a specified OSD display on the display device; an audio signal processing unit for issuing audio output based on the audio signals to an audio output unit; and a control unit for controlling the abovementioned units including the input and output units and the memory, wherein the memory stores a pre-recorded language list concerning broadcasting languages that have possibility of being broadcasted from the broadcasting station; and the control unit executes; a process of OSD displaying the language list on the display device, preparing a priority language list by allowing the user to select broadcasting languages sequentially in the order of priority by using the input unit, and storing it in the memory, as well as acquiring the maximum number of audio channels that can be outputted by the audio output unit based on the user's input by using the input unit and storing it in the memory; a process of acquiring broadcasting language information and audio channel information broadcasted over a channel currently being received by referring to a VCT (Virtual Channel Table) acquired by analyzing the control signals extracted by the signal extracting unit either when the receiver is turned on or a channel change instruction is inputted by the user, or when a broadcast program is changed; and a process of automatically selecting a broadcasting language to be outputted by the audio output unit from the broadcasting language information based on the order of priority of the priority language list, automatically deciding the number of audio channels to be outputted from the audio output unit within the range of the maximum number of audio channels based on the audio channel information, and transmitting signals concerning the broadcasting language and the number of audio channels to be outputted from the audio output unit to the audio signal processing unit.

In this configuration, the control unit displays on the OSD the language list pre-registered in the memory and allows the user to select multiple priority languages from the language list to prepare a priority language list. The selection of the priority language is performed using the input device; for example, an "arrow key" is used to move a cursor in the language list to select priority languages in the order of priority and decide each selection by pressing an "enter key." Moreover, the maximum number of audio channels that can be outputted by the audio output unit is entered at the same time. The control unit acquires the channel information containing the broadcasting language information and the audio channel information of the channel being received by referring to the VCT when the receiver is started up or the channel is switched. The control unit automatically retrieves the priority languages selected by the user from the audio channel information in the order of priority. If it is found that priority languages exist as a result of the retrieval, the signal related to the language that corresponds to the language with a higher priority is transmitted to the audio signal-processing unit, so that the audio output is generated in the language of the higher priority. Furthermore, the control unit decides the number of audio channels so as not to exceed the maximum number of audio channels established by the user. This decision is made in such a way as to maximize the number of audio channels within the above-mentioned maximum number referring to the audio channel information. Therefore, if the maximum allowable number of audio channels that can be outputted by the audio output unit connected to the broadcasting receiver is set up, it is possible to acquire the audio output always maximizing the capability of the audio output unit. The signal that relates to thus decided number of audio channels is transmitted to the audio signal-processing unit so that the audio output is generated in the corresponding number of audio channels. Thus, it is possible to always select and to decide automatically the broadcasting language and the number of audio channels which are most suitable for the user when the broadcasting language and audio channel vary with each channel, and possible to generate the audio output from the audio output unit.

DETAILED DESCRIPTION OF THE PREFERRED EMBODIMENT OF THE PRESENT INVENTION

Figure 1:
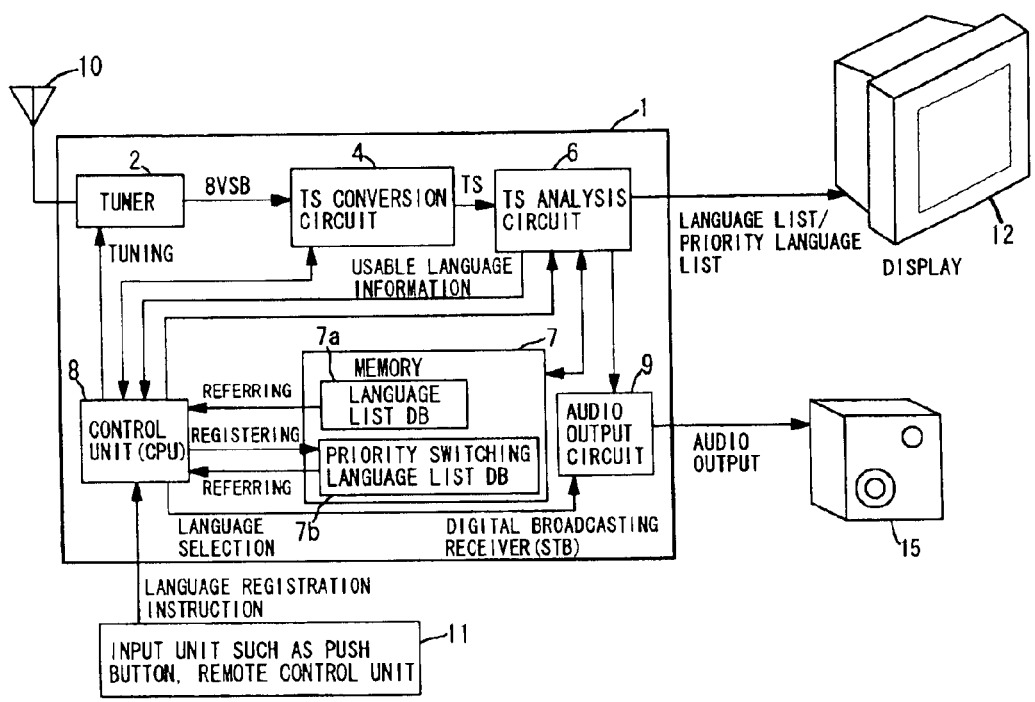
FIG. 1 is a block diagram of a digital broadcasting receiver according to an embodiment of the invention.

A digital broadcasting receiver according to a preferred embodiment of the present invention will be described with reference to the accompanying drawings. FIG. 1 is a block diagram of the STB. A STB 1 receives via an antenna 10 encoded digital broadcasting signals conforming to the ATSC Standards transmitted from a television broadcasting station in accordance with the user's operating input using an input device 11 such as a pushbutton or a remote control unit, and converts the signals to image signals based on the NTSC Standards to be displayed on a display device 12.

The STB 1 comprises: a tuner 2 (receiving unit) for receiving the digital broadcasting signals transmitted according to, for example, the modulation format of 8VSB (Vestigial Side Band), a TS conversion circuit 4 for converting the digital broadcasting signals received by the tuner 2 into transport stream (hereinafter called "TS") signals, a TS analysis circuit 6 for decoding image signals by analyzing the TS signals converted by the TS conversion circuit 4 and displaying images on the display device 12, a memory 7 for storing the transmission frequency and broadcasting language information of each main channel of the digital broadcast and the priority languages set up by the user, an audio output circuit 9 (audio signal processing unit) for extracting the digital audio signals of specified broadcasting languages and generating audio outputs to a speaker 15 (audio output unit), and a control unit 8 consisting of a CPU for controlling each unit of the receiver.

The tuner 2 receives digital broadcasting signals picked up by the antenna 10, selects a station in accordance with an instruction entered by the user into the control unit 8 using the input device 11, and receives 8VSB-modulated digital broadcasting signals existing in the frequency range corresponding to the channel inputted by the user. The TS conversion circuit 4 converts the 8VSB-modulated broadcasting signals received by the tuner 2 into TS signals.

Figure 2:
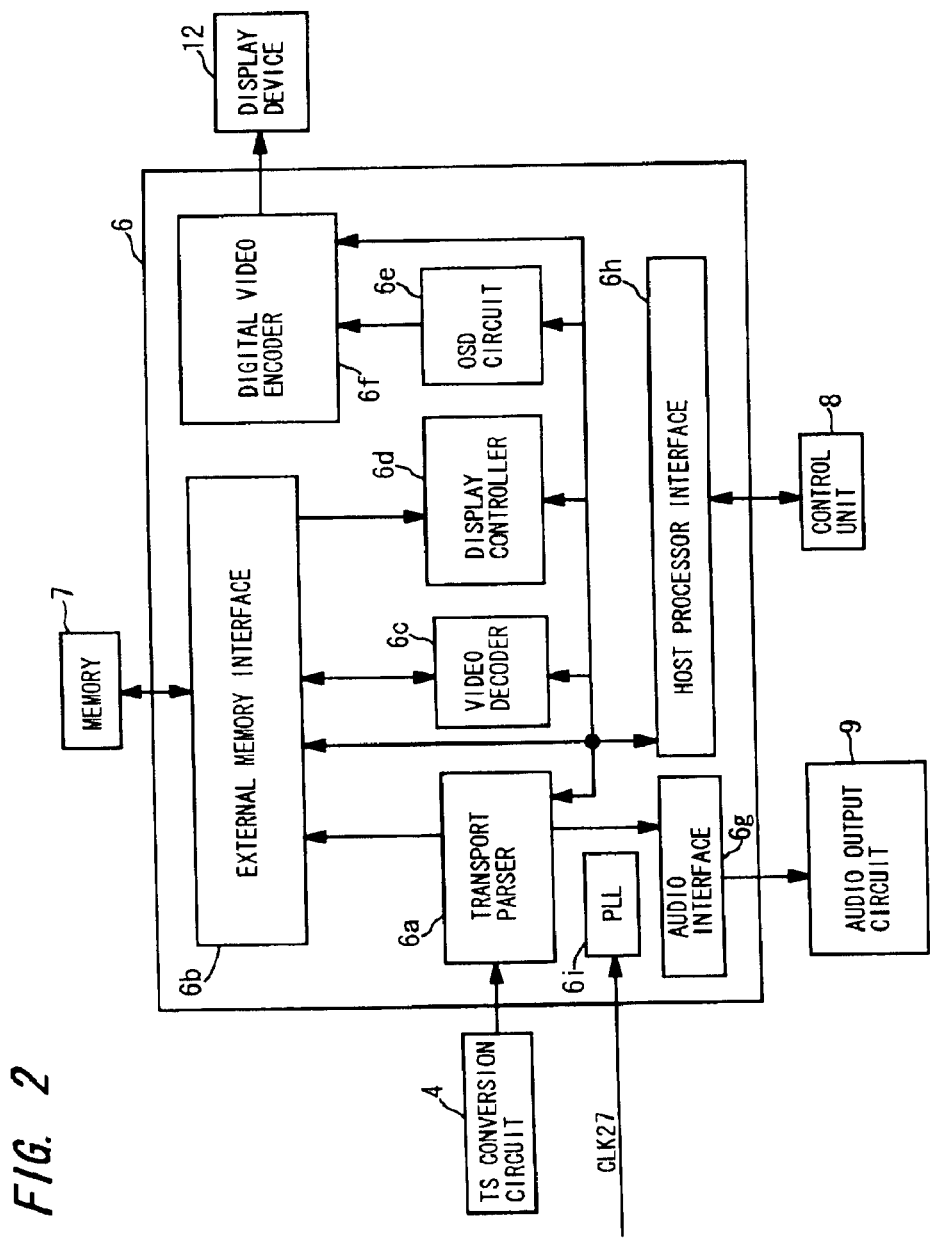
FIG. 2 is a block diagram of the TS (Transport Stream) analysis circuit of the receiver.

The TS analysis circuit 6 analyzes the TS signals converted by the TS conversion circuit 4, and outputs image signals to the display device 12 added with OSD displays as needed. FIG. 2 is a block diagram of the TS analysis circuit 6. The TS analysis circuit 6 comprises: a transport parser 6a (signal extraction unit), an external memory interface 6b, a video decoder 6c (digital decoding unit), a display controller 6d, an OSD circuit 6e (OSD output unit), a digital video encoder 6f, an audio interface 6g, a host processor interface 6h, and a PLL (Phase Locked Loop) circuit 6i. The transport parser 6a acquires TS signals transmitted from the TS conversion circuit 4, and parses them to image signals, audio signals and control signals. The external memory interface 6b receives instruction from the control unit 8 via the host processor interface 6h, and is in charge of connections with the transport parser 6a, the video decoder 6c, and the display controller 6d as well as with the memory 7. For example, image signals, audio signals, and control signals parsed by the transport parser 6a are stored into the memory 7 via the external memory interface 6b respectively.

Upon receiving an instruction from the control unit 8, the video decoder 6c retrieves the image signals stored in the memory 7 to be decoded. Upon receiving an instruction from the control unit 8, the display controller 6d converts the image signals decoded by the video decoder 6c into the NTSC format. Upon receiving an instruction from the control unit 8, the OSD circuit 6e sends out the image signals converted into the NTSC format by the video decoder 6c to the digital video encoder 6f, and also sends out the image signals attached with OSD display as needed to the digital video encoder 6f. Upon receiving an instruction from the control unit 8, the OSD circuit 6e executes an arithmetic operation to add an OSD display for each image signal frame in order to make an OSD display in specified colors on the display device 12.

Upon receiving an instruction from the control unit 8, the digital video encoder 6f converts the image signals received from the OSD circuit 6e into analog signals to be outputted to the display device 12. The audio interface 6g sends out audio signals parsed by the transport parser 6a to the audio output circuit 9. The host processor interface 6h transmits instructions from the control unit 8 to the transport parser 6a, the external memory interface 6b, the video decoder 6c, the display controller 6d, the OSD circuit 6e, and the digital video encoder 6f. The PLL circuit 6i causes a local oscillation frequency to match with a specified frequency based on an inputted clock signal.

The memory 7 stores control signals parsed by the transport parser 6a. The memory 7 stores a language database 7a, which holds broadcasting languages that have possibility to be used in broadcasts from the broadcasting station, and a priority switching language list (priority language list) database 7b, which stores the broadcasting languages given priority in selection. The control unit 8 controls each unit through a data-bus upon receiving the user's instructions entered by means of the input device 11. For example, the control unit 8 analyzes a VCT (Virtual Channel Table) by retrieving control signals which have been parsed by the transport parser 6a and stored in the memory 7, acquiring the channel information of the channel currently being received based on status signals included therein, and outputs this channel information to the display device 12 via the OSD circuit 6e and the digital video encoder 6f.

The audio output circuit 9 converts audio signals acquired from the audio interface 6g to audio signals for the speaker 15, to output the audio signals to the speaker 15. More specifically, it extracts audio signals instructed by the control unit 8, and decodes them to convert into analog signals. The input device 11 is a device used for inputting the user's instructions such as channel switching to the control unit 8. Examples of the input device 11 include pushbuttons provided on the front of the STB 1 and a remote control unit used for providing operation instructions for the STB 1 by means of infrared rays. The display device 12 can be a display of a television, a CRT, a flat panel display such as an LCD (Liquid Crystal Display) and a PDP (Plasma Display Panel). If the display device 12 is capable of accepting digital signal input, the system can be configured by directly connecting the OSD circuit 6e with the input terminal of the display device 12 without going through the digital video encoder 6f. The speaker 15 is connected to the audio output circuit 9, and generates audio output based on audio signals processed by the audio output circuit 9.

Figure 3:
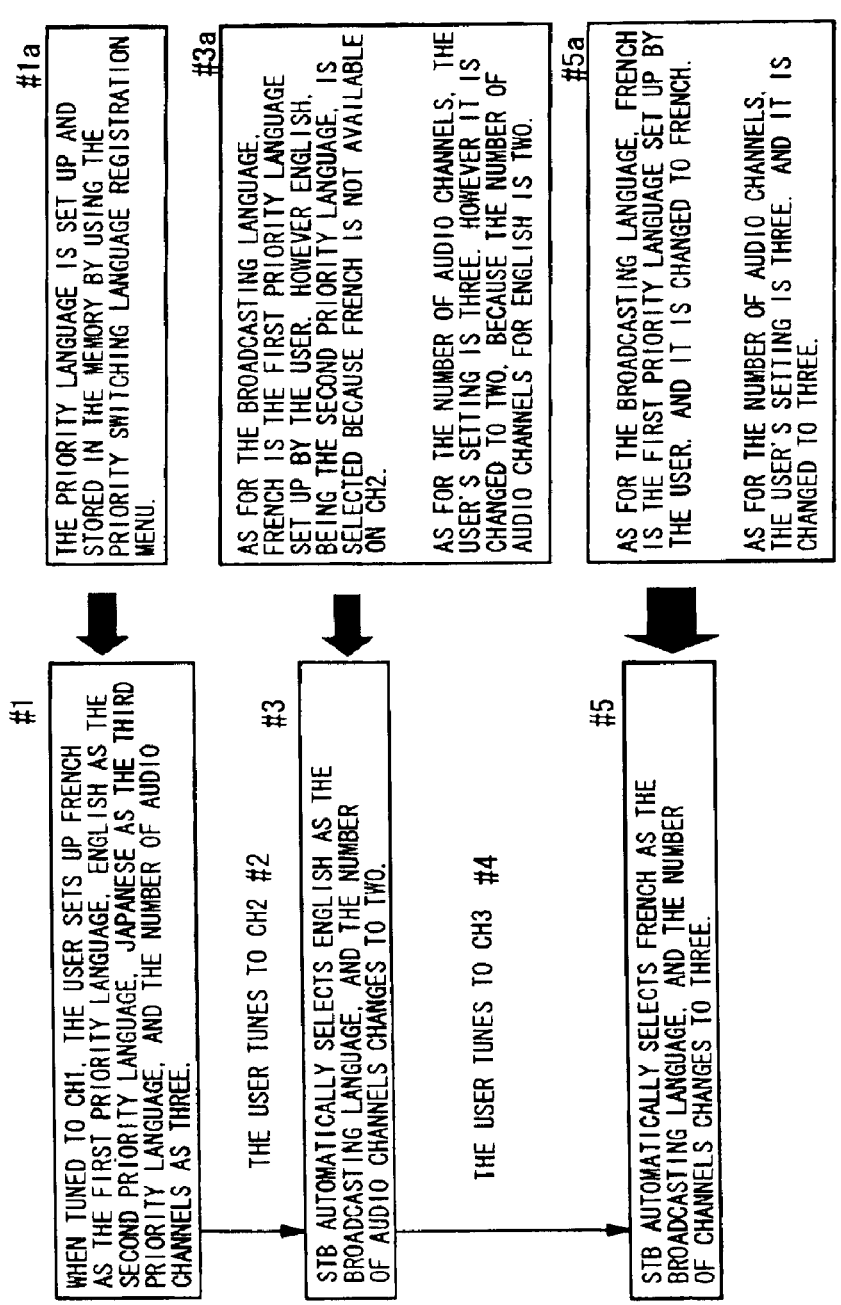
FIG. 3 is a diagram showing a process sequence for changing broadcasting languages and audio channels when changing channels of the receiver.

The control unit 8 in this embodiment automatically selects and decides the optimum broadcasting language and the number of audio channels for the user in correspondence with broadcasting languages and audio channels that vary with each channel. FIG. 3 shows how broadcasting languages and the number of audio channels are changed by means of operating the STB 1 when the channel is changed by the user. At present, digital broadcasts are transmitted from stations CH1 through CH3. In other words, the broadcasts on station CH1 are conducted in English and French broadcasting languages. The number of audio channels is set up for each of these broadcasting languages; e.g., five channels for English and three channels for French. Similarly, the broadcasts by station CH2 are conducted in English, Spanish and Japanese languages, wherein the broadcasts are transmitted over two channels for English, one channel for Spanish, and one channel for Japanese. The broadcasts by station CH3 are conducted in English, Spanish and French, wherein the broadcasts are transmitted over five channels in English, four channels in Spanish, and four channels in French. Let us assume that the user is tuned into the CH1 station, and sets up French as the first priority language, English as the second priority language, Japanese as the third priority language, and three channels as the number of audio channels (#1).

Figure 4:
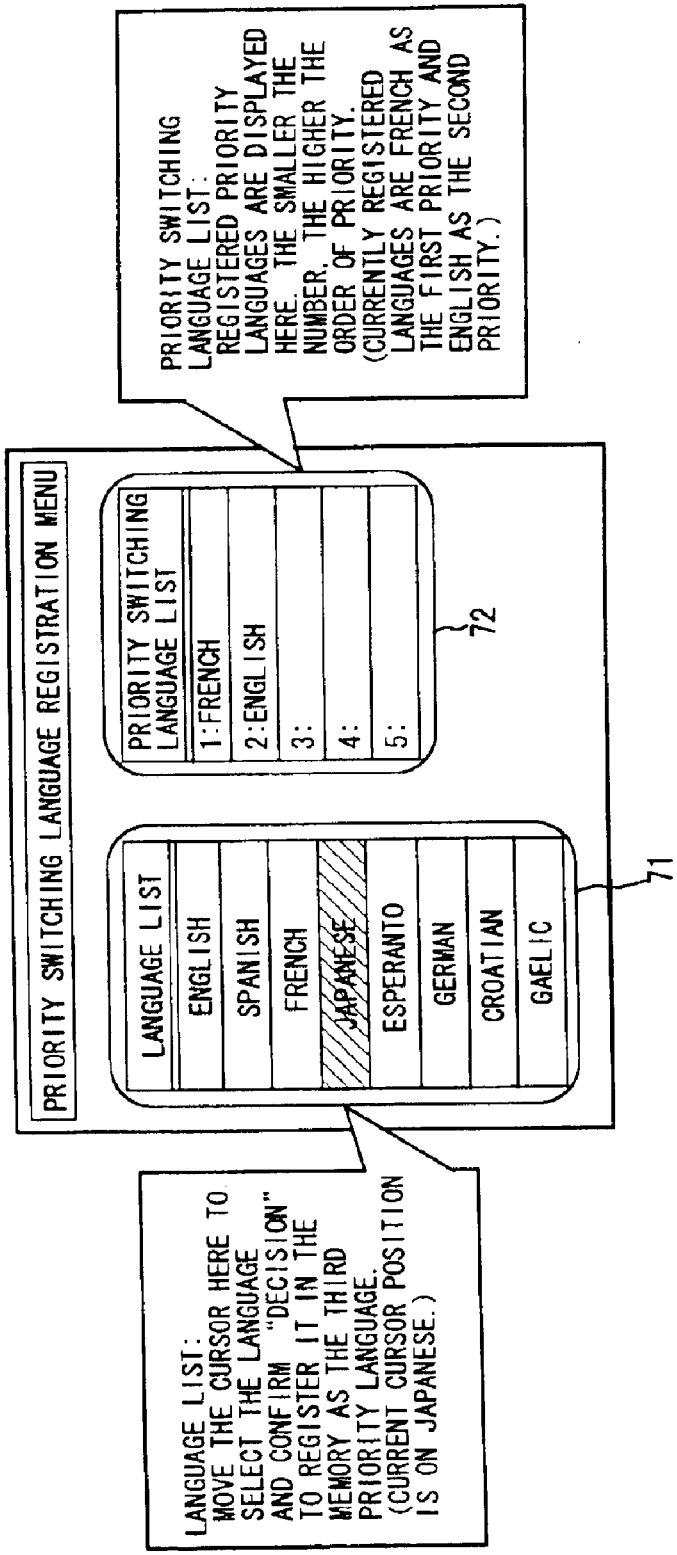
FIG. 4 is a diagram showing a priority channel list being prepared by the receiver.

FIG. 4 shows the "Priority Switching Language Registration Menu" screen on which the switching of the priority language is set up and registered. After pressing the "menu key" on the input device 11 to display (OSD) the menu screen on the display device 12, the user selects the "Priority Switching Language Registration Menu" on the current menu to activate its OSD display. The "Priority Switching Language Registration Menu" displays a language list 71 on the left column by referring to the language list data base 7a and a priority language list 72 (priority switching language list) on the right column referring to the priority switching language list database 7b. The priority language registered in the memory 7 is displayed on this priority language list referencing the number that shows the order of priority. French is already registered as the first priority language, and English is registered as the second priority language. The case of registering Japanese as the third priority language will be described below. First, operate the "arrow key" of the input device 11 to move the cursor indicated by a hatched area in FIG. 4 and select Japanese. Next, press the "enter key" to confirm the selection to complete the registration of Japanese as the third priority language in the memory 7.

Executing the above procedures on the Priority Switching Language Registration Menu will set up a language as a priority language and the result will be stored in the memory 7 (#1a). When the user selects the station CH2 (#2) next, the STB 1 switches the broadcasting language to English and the number of audio channels to two channels (#3). In other words, although the first priority language chosen by the user is French, it is not available on station CH2, so the broadcasting language is switched to English, which is the second priority language. Also, although the number of audio channels set up by the user is three, it is switched to two, which is the maximum number of broadcasting channels available as the number of audio channels for English on station CH2 (#3a).

When the user selects the station CH3 (#4), the STB 1 changes the broadcasting language to French and the number of audio channels to three (#5). In other words, the broadcasting language is switched to French, because French, which is the first priority language set up by the user, is used for broadcasting on station CH3. As for the number of audio channels, it is switched to three which is the maximum number of channels set up by the user while the number of French audio channels available on station CH3 is four (#5a). Thus, when the user changes the selected channel, the broadcasting language and the number of audio channels are selected and decided automatically to be most suitable for the user according to the user's own selection and the resultant audio output is available accordingly from the audio output unit.

Figure 5:
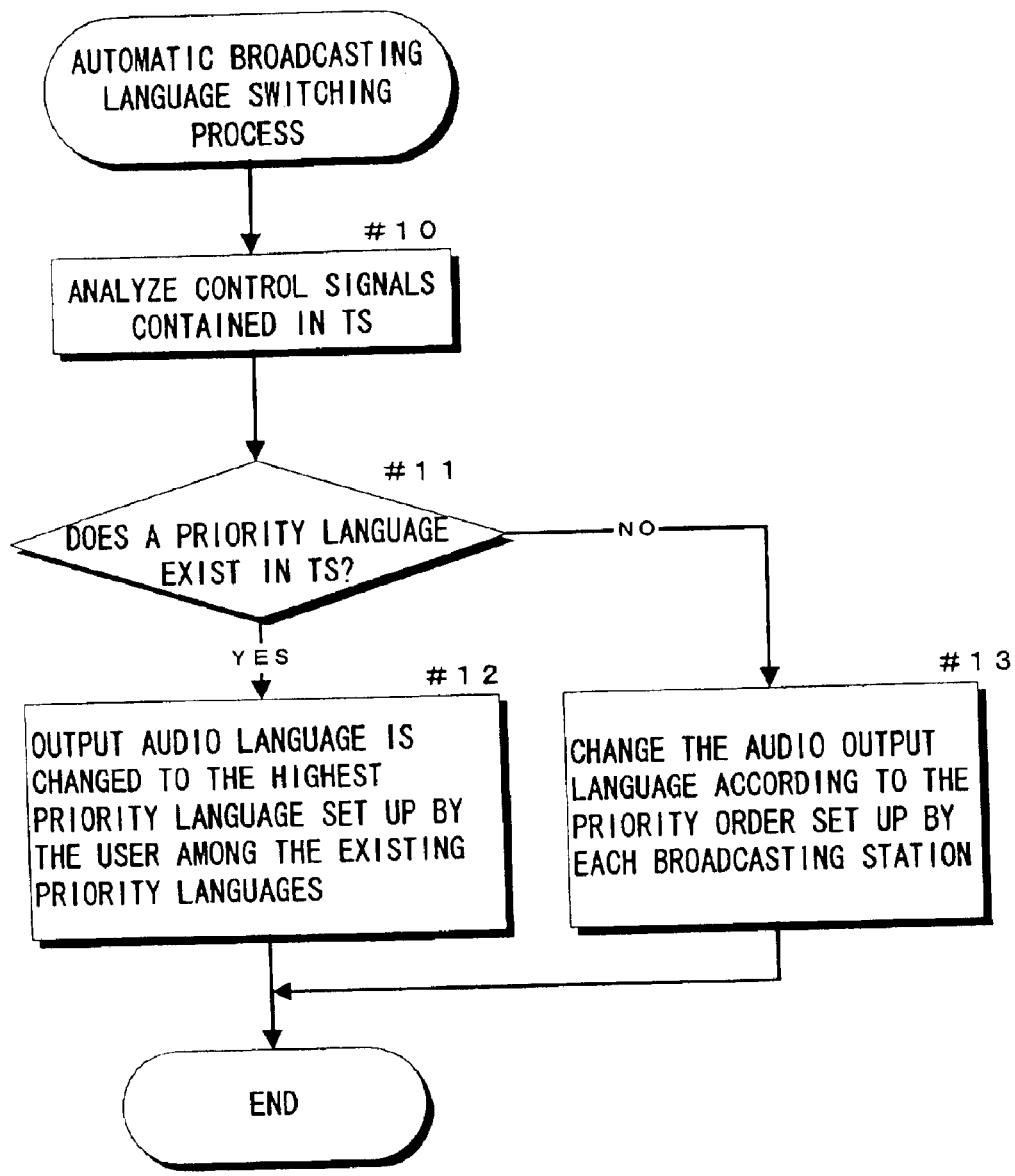
FIG. 5 is a flowchart showing a process sequence for the control unit of the receiver changing broadcasting languages.

FIG. 5 shows the sequence of the process executed by the control unit 8 when the broadcasting language is automatically switched. First, the control signal contained in the TS is analyzed to recognize the broadcasting language existing in the TS (#10). If the priority language registered in the priority language list is recognized to exist in the TS (Yes in #11), the output audio language is switched to the one registered by the user with the highest priority among the languages existing (#12). Also, if the priority language does not exit in the TS (No in #11), the audio output language is switched in accordance with the order of priority designated by each broadcasting station (#13).

Thus, in this embodiment, it is possible to always select and decide automatically the most suitable broadcasting language for the user based on the priority language list set up by the user even after the channel is changed and the resultant audio output is available accordingly from the audio output unit. Once the priority language list 72 is determined, its contents will be stored in the memory 7, so that a broadcasting language closest to the user's preference will be outputted on whichever channel (station) the user switches to. Also, the number of audio channels is automatically decided in accordance with broadcasting signals within the range of the number of audio channels set up by the user. Therefore, if the number of audio channels is set up in conformance with the number of channels of the speaker 15 connected to the STB 1, an audio output that uses the capability of the speaker 15 to the fullest degree will always be achieved.

Furthermore, when multiple users use the broadcasting receiver in common and their priority languages are different between each other, multiple priority languages lists are useful. That is, the memory 7 is capable of classifying and storing the multiple priority language lists, and the control unit 8 allows the user to select one of the classified multiple priority language lists. Thus, each user can have own priority language list, so the user convenience is enhanced.

The present invention can be implemented in various forms without being limited by the configuration of the embodiment described above. For example, the STB 1 can be configured to be able to receive NTSC analog broadcasting signals as well, in addition to ATSC digital broadcasting signals. In such a case, the tuner 2 should have the capability of receiving broadcasting signals in the band used for analog broadcasts, and the STB 1 should be equipped with an analog decoder separately for decoding analog broadcasting signals received by the tuner 2. The priority language list 72 can be configured in such a way as to allow multiple broadcasting languages to be selected for one order of priority. In such a case, multiple broadcasting languages can be outputted simultaneously from the speaker 15.

What is claimed is:

1. A broadcasting receiver comprising: an input unit for entering channel change instructions into the receiver; a receiving unit for receiving coded digital broadcasting signals transmitted by a broadcasting station accompanying audio signals of multiple languages; a signal extracting unit for extracting image signals, audio signals and control signals from the digital broadcasting signals received by the receiving unit; a decoding unit for decoding the image signals extracted by the signal extracting unit, and outputting the decoded signals to a display device connected to the receiver for displaying images; a memory for storing the control signals extracted by the signal extracting unit; an on-screen display ("OSD") output unit for generating a specified OSD display on the display device; an audio signal processing unit for issuing audio output based on the audio signals to an audio output unit; and a control unit for controlling the abovementioned units including the input and output units and the memory, wherein the control unit executes:

a process of preparing a priority language list by allowing the user to select broadcasting languages sequentially in the order of priority by using the input unit and storing it in the memory;

a process of acquiring broadcasting language information broadcasted over a channel currently being received by referring to a VCT (Virtual Channel Table) acquired by analyzing the control signals extracted by the signal extracting unit either when the receiver is turned on or a channel change instruction is inputted by the user, or when a broadcast program is changed; and a process of automatically selecting a broadcasting language to be outputted by the audio output unit from the broadcasting language information based on the order of priority of the priority language list and transmitting signals concerning the broadcasting language to the audio signal processing unit.

2. The broadcasting receiver which executes an automatic audio selection as set forth in claim 1, wherein the memory stores a pre-recorded language list concerning broadcasting languages that have possibility of being broadcasted from the broadcasting station; and the control unit generates an OSD display of the language list on the display device in preparing the priority language list.

3. The broadcasting receiver which executes an automatic audio selection as set forth in claim 2, wherein the control unit automatically selects broadcasting languages to be outputted from the audio output unit in accordance with an order of priority set up by the broadcasting station, when no broadcasting language selected in the priority language list exists in the broadcast language information, and transmits signals concerning the broadcast languages to be outputted from the audio output unit to the audio signal processing unit.

4. The broadcasting receiver which executes an automatic audio selection as set forth in claim 3, wherein the memory is capable of classifying and storing the multiple priority language lists, and the control unit allows the user to select one of the classified multiple priority language lists.

5. The broadcasting receiver which executes an automatic audio selection as set forth in claim 2, wherein the memory is capable of classifying and storing the multiple priority language lists, and the control unit allows the user to select one of the classified multiple priority language lists.

6. The broadcasting receiver which executes an automatic audio selection as set forth in claim 1, wherein the control unit automatically selects broadcasting languages to be outputted from the audio output unit in accordance with an order of priority set up by the broadcasting station, when no broadcasting language selected in the priority language list exists in the broadcast language information, and transmits signals concerning the broadcast languages to be outputted from the audio output unit to the audio signal processing unit.

7. The broadcasting receiver which executes an automatic audio selection as set forth in claim 6, wherein the memory is capable of classifying and storing the multiple priority language lists, and the control unit allows the user to select one of the classified multiple priority language lists.

8. The broadcasting receiver which executes an automatic audio selection as set forth in claim 1, wherein the memory is capable of classifying and storing the multiple priority language lists, and the control unit allows the user to select one of the classified multiple priority language lists.

9. A broadcasting receiver comprising: an input unit for entering channel change instructions into the receiver; a receiving unit for receiving coded digital/analog broadcasting signals transmitted by a broadcasting station accompanying audio signals of multiple languages; a signal extracting unit for extracting image signals, audio signals and control signals from digital broadcasting signals received by the receiving unit; a digital/analog decoding unit for decoding the image signals extracted by the signal extracting unit or image signals contained in the analog broadcasting signals, and outputting the decoded signals to a display device connected to the receiver for displaying images; a memory for storing the control signals extracted by the signal extracting unit; an on-screen display ("OSD") output unit for generating a specified OSD display on the display device; an audio signal processing unit for issuing audio output based on the audio signals to an audio output unit; and a control unit for controlling the abovementioned units including the input and output units and the memory, wherein the memory stores a pre-recorded language list concerning broadcasting languages that have possibility of being broadcasted from the broadcasting station; and the control unit executes;

a process of OSD displaying the language list on the display device, preparing a priority language list by allowing the user to select broadcasting languages sequentially in the order of priority by using the input unit, and storing it in the memory, as well as acquiring the maximum number of audio channels that can be outputted by the audio output unit based on the user's input by using the input unit and storing it in the memory;

a process of acquiring broadcasting language information and audio channel information broadcasted over a channel currently being received by referring to a VCT (Virtual Channel Table) acquired by analyzing the control signals extracted by the signal extracting unit either when the receiver is turned on or a channel change instruction is inputted by the user, or when a broadcast program is changed; and a process of automatically selecting a broadcasting language to be outputted by the audio output unit from the broadcasting language information based on the order of priority of the priority language list, automatically deciding the number of audio channels to be outputted from the audio output unit within the range of the maximum number of audio channels based on the audio channel information, and transmitting signals concerning the broadcasting language and the number of audio channels to be outputted from the audio output unit to the audio signal processing unit.

10. The broadcasting receiver which executes an automatic audio selection as set forth in claim 9, wherein the memory is capable of classifying and storing the multiple priority language lists, and the control unit allows the user to select one of the classified multiple priority language lists.

* * * * *